United States Patent
Das et al.

(10) Patent No.: US 9,588,761 B2
(45) Date of Patent: Mar. 7, 2017

(54) MAINTENANCE TOOLKIT FOR THE IMPLEMENTATION OF COMPUTER PROGRAMS

(71) Applicant: TATA CONSULTANCY SERVICES LIMITED, Mumbai, Maharashtra (IN)

(72) Inventors: Tanay K. Das, Balasore District (IN); Bashisht N. Singh, Bhubaneswar (IN)

(73) Assignee: Tata Consultancy Services Limited (IN)

( * ) Notice: Subject to any disclaimer, the term of this patent is extended or adjusted under 35 U.S.C. 154(b) by 0 days.

(21) Appl. No.: 14/698,374

(22) Filed: Apr. 28, 2015

(65) Prior Publication Data
US 2016/0202970 A1    Jul. 14, 2016

(30) Foreign Application Priority Data
Jan. 9, 2015    (IN) .............................. 81/MUM/2015

(51) Int. Cl.
*G06F 9/44*    (2006.01)
*G06F 17/30*    (2006.01)

(52) U.S. Cl.
CPC .................. *G06F 8/74* (2013.01); *G06F 8/75* (2013.01); *G06F 17/30864* (2013.01); *G06F 8/73* (2013.01)

(58) Field of Classification Search
CPC ........ G06F 8/73; G06F 17/30864; G06F 8/74; G06F 8/75
USPC .................................. 717/100–103, 120–123
See application file for complete search history.

(56) References Cited

U.S. PATENT DOCUMENTS

| | | |
|---|---|---|
| 6,698,013 B1 | 2/2004 | Bertero et al. |
| 6,981,207 B1 | 12/2005 | Bakman et al. |
| 7,533,369 B2 | 5/2009 | Sundararajan et al. |
| 7,702,600 B2 * | 4/2010 | Deshpande ........... G06F 19/345 706/45 |

(Continued)

FOREIGN PATENT DOCUMENTS

AU    761413 B2    6/2003

OTHER PUBLICATIONS

Gruska et al., "Sort-Aware Query Scheduling in Database Management Systems ", 2012, IBM Canada Software Lab, Canada, pp. 2-10.*

*Primary Examiner* — Ted T Vo
(74) *Attorney, Agent, or Firm* — Fishman Stewart PLLC

(57) ABSTRACT

A maintenance toolkit for the implementation of computer programs is envisaged. The toolkit receives computer programs containing a plurality of modules. These modules contain a plurality of components. On reception of a computer program, the toolkit extracts metadata from the modules and the components present in the computer program, and then stores the metadata it in a local repository. The envisaged toolkit then creates a table identifying the components and modules inter-dependent and intra-dependent on each other and also creates a hierarchy table based on the identified dependencies. This allows the toolkit to create a dependency table which is then stored for future reference along with other corresponding information. When a user has any query related to any module or component present in the computer program, the toolkit accepts the query and creates reports based on the dependency data and user query. These reports are then provided to the user.

8 Claims, 1 Drawing Sheet

(56) References Cited

U.S. PATENT DOCUMENTS

| | | | |
|---|---|---|---|
| 8,271,542 B1* | 9/2012 | London | G06F 17/30997 707/790 |
| 8,566,115 B2* | 10/2013 | Moore | G06F 17/3089 705/2 |
| 2006/0230011 A1* | 10/2006 | Tuttle | G06F 17/30864 706/62 |
| 2007/0106537 A1* | 5/2007 | Moore | G06F 17/3089 705/3 |
| 2007/0116037 A1* | 5/2007 | Moore | G06F 17/3089 370/462 |
| 2011/0202933 A1 | 8/2011 | Sherrill | |

* cited by examiner

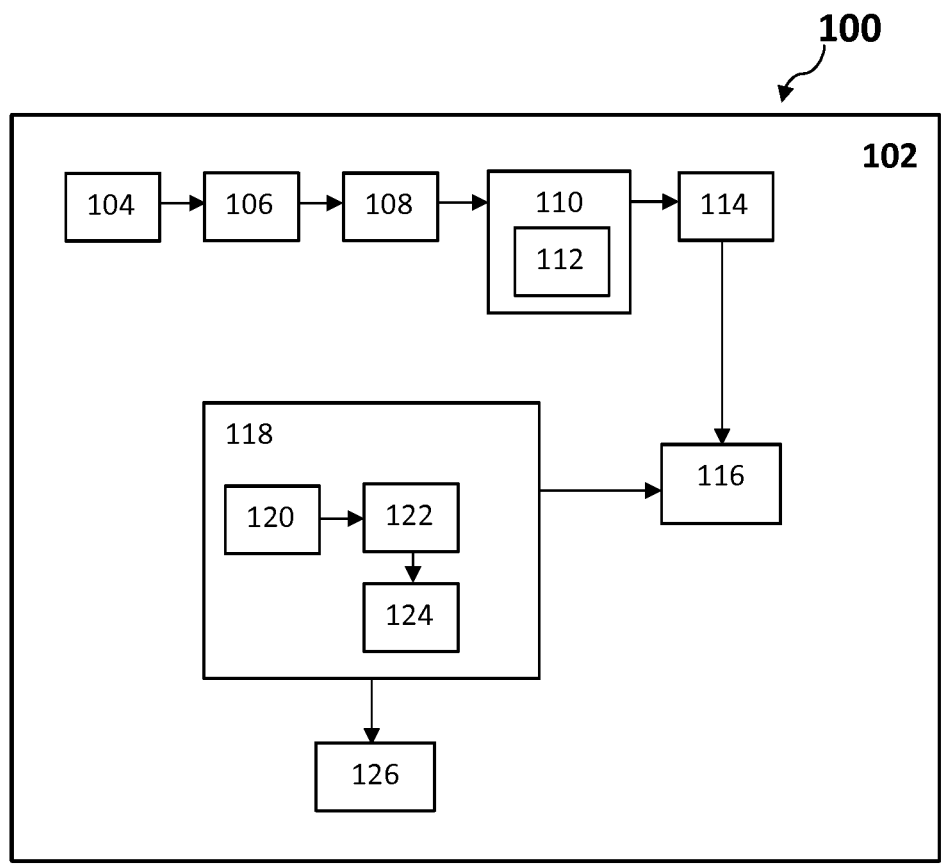

MAINTENANCE TOOLKIT FOR THE IMPLEMENTATION OF COMPUTER PROGRAMS

FIELD OF DISCLOSURE

The present disclosure relates to the field of maintaining information related to the computer programs.

DEFINITIONS OF TERMS USED IN THE SPECIFICATION

The expression 'maintaining a computer program' used hereinafter in the specification refers to but is not limited to storing, managing and updating documentation/information relating to the computer program. It also includes providing reports related to queries raised by users related to the computer program.

These definitions are in addition to those expressed in the art.

BACKGROUND

Software documentation is a process of writing a document that explains the steps involved in developing or using software. Generally, software developers need to create pages of documents that include analysis of a software, design documents and numerous specifications related to the software. These documents need to be updated by developers during various phases till the software is developed. After the software is developed completely, the maintenance support team handles created documentation in order to understand and provide support for the software. Such 'text book' type documentation is voluminous to read. In addition, it is a tedious process to read and understand the complete documentation and update it from time to time while the software is modified. Maintaining such documentation is also cumbersome. This might result in loss of significance of the documentation. Moreover, the maintenance team can fail to correctly update the documentation from time to time.

Documentation tools that are available nowadays help in automating the process of documentation during design and development phases of softwares, but, these tools lack in providing necessary support during the phase of maintenance.

Therefore, there is a need for an automated system that stores, maintains, updates and manages documentation after development of a software.

OBJECTS

It is an object of the present disclosure to provide an automated system to store, update, maintain and manage computer programs after their development.

Another object of the present disclosure is to provide a system that captures and stores information of a computer program along with the relationship and dependencies between multiple modules and components within the computer program.

Yet another object of the present disclosure is to provide a system that correctly identifies impact of a change in modules and components of a computer programs on each other.

Other objects and advantages of the present invention will be more apparent from the following description when read in conjunction with the accompanying FIGURES, which are not intended to limit the scope of the present disclosure.

SUMMARY

The present disclosure envisages a computer implemented maintenance toolkit for implementation of computer programs.

Typically in accordance with the present disclosure, the toolkit for implementation of computer programs comprises a system processor possessing functional elements and a pre-determined set of rules to provide system processing commands. A receiver present in the toolkit is configured to receive a computer program containing a plurality of modules, and the modules containing a plurality of components. A metadata retriever cooperating with the receiver is adapted to receive the modules and components within the computer program, and is configured to extract metadata from the plurality of components contained in the plurality of modules in the program. A local repository cooperating with the metadata retriever receives this metadata and is configured to store the metadata. An impact analyzer present in the toolkit cooperating with the local repository and is adapted to receive the stored metadata and analyze impact of the modules on each other by identifying inter-dependencies and intra-dependencies between the plurality of components within said plurality of modules within the computer program to obtain dependency data, the impact analyzer comprises a hierarchy generator which is configured to create a hierarchy structure of the modules and the components based on the dependency data. A dependency recorder present in the toolkit is adapted to cooperate with the impact analyzer to receive the dependency data and the hierarchy structure, and is configured to create, based on the dependency data and the hierarchy structure, a dependency table containing information related to the modules and components and their respective dependencies. A central repository present in the toolkit cooperates with the dependency recorder for receiving the dependency table and storing the dependency table with corresponding information related to the modules and components within the computer program to maintain the computer program. A query manager cooperates with the central repository. The query manager comprises an input module that accepts input queries from users including queries related to the modules and the components. The query manager also comprises a crawler extractor that cooperates with the input module to identify the modules and the components from the input queries and is configured to crawl through the central repository and extract from the central repository, dependency information stored in the dependency table corresponding to the identified modules and components. The query manager further comprises a reporting module that cooperates with the crawler and extractor for receiving the dependency information corresponding to the input queries, and is configured to create reports explaining the received dependency information.

In accordance with the present disclosure, there is provided a method of implementing maintenance toolkit for computer programs, the method comprising the following:

possessing functional elements and a pre-determined set of rules for providing system processing commands;

receiving a computer program containing a plurality of modules, said modules containing a plurality of components;

extracting metadata from said plurality of components contained in said plurality of modules;

storing said metadata;

receiving the stored metadata and analyzing impact of said modules on each other by identifying inter-dependencies and intra-dependencies between said plurality of components within said plurality of modules within the computer program to obtain dependency data;

creating a hierarchy structure of said modules and said components based on the dependency data;

receiving the dependency data and the hierarchy structure and creating based on the dependency data and the hierarchy structure, a dependency table containing information related to said modules and components and their respective dependencies;

storing in a central repository, the dependency table with corresponding information related to said modules and components within the computer program to maintain said computer program;

accepting input queries from users, said input queries including queries related to said modules and said components;

identifying said modules and said components from the input queries and crawling through the central repository and extracting from the central repository, dependency information stored in the dependency table corresponding to the identified modules and components; and receiving the dependency information corresponding to the input queries and creating reports explaining the received dependency information.

BRIEF DESCRIPTION OF THE ACCOMPANYING DRAWING

The system of the present disclosure will now be described with reference to the non-limiting, accompanying drawing, in which:

FIG. 1 illustrates a schematic of the maintenance toolkit for implementation of computer programs.

DETAILED DESCRIPTION OF THE ACCOMPANYING DRAWING

A preferred embodiment of the present disclosure will now be described in detail with reference to the accompanying drawings. The preferred embodiment does not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The following description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Typically, in order to maintain documentation/information related to any computer program or components included in the computer program, a concerned person needs to identify data that needs to be documented and then create a text book type documentation report/file for further use. This process tends to develop a psychological aversion to creating 'text book' type of documents. The present disclosure provides a toolkit that helps in automatically storing and updating documentation related to a computer program and in analyzing impact of changes of components on each other within the computer program.

Considering an example of a Hospital Management software, this software includes various modules and components that provide different functionalities. When a user wants to implement certain specific functionalities using a conventional system, it is very difficult to know what forms, reports, processes, functions, packages and other components should be trimmed from the entire computer program to just run the asked modules providing specific functionalities. Typically, the entire computer program (in this case the Hospital Management software) is installed along with the components that have no use and the ones that were developed during various phases of development and testing. To change and avoid this and install only the required modules, conventional systems/computer program providers disable or remove the unrequested modules from the menu without understanding the effects of the removal or interchanges. Because of this step of disabling some modules, maintenance of the installed program becomes difficult as many unnecessary components need to be maintained which do not provide any value addition to a customized implementation of the computer program. This directly has an impact on schedule and cost. Additionally, during the process of handing over the requested customized computer program to the user, usability of many unnecessary components (especially database components) that were retained needs to be explained to the user. This certainly has a negative effect on confidence of the user in the customized computer program provider.

In such a situation when a maintenance toolkit, as envisaged in the present disclosure, is used by a computer program provider and a user requests customization of a computer program (for example, Hospital Management software) using some selected modules and modification of other modules, the maintenance toolkit first identifies a list of required components of asked modules and their inter-dependencies. On identification, only those components that are absolutely essential as per the user requirement are deployed. This process significantly reduces the duration of implementation as only required components are deployed, less number of tables which corresponded to less data preparation and migration are populated, and also less number of data migration routines are required and written. This toolkit also helps in providing a justified explanation for the components that are installed which in turn builds confidence in the user.

Referring to the accompanying drawings, FIG. 1 illustrates a schematic of the maintenance toolkit 100 for implementation of computer programs. Here the implementation of computer programs includes storing, updating, maintaining, managing and providing dependencies within the computer programs. The toolkit 100 includes a system processor 102 that possesses functional elements and a pre-determined set of rules to provide system processing commands. These system processing commands include various commands for carrying out different functions by different modules present in the toolkit 100. The toolkit 100 includes a receiver 104 which receives from a user a computer program that needs to be maintained/deployed. The computer program contains a plurality of modules, which in turn include a plurality of components. These components may be forms, graphs, sequences, views, procedures, tables, objects, triggers and the like. These modules may also comprise a plurality of sub-modules further containing plurality of components. A metadata retriever 106 extracts metadata from such plurality of components contained in the plurality of modules within the computer program received by the receiver 104. This extracted metadata is then store in a local repository 108 present in the system 100. The metadata is stored and associated with the respective components/modules of the computer program for future identification and processing. An impact analyzer 110 utilizes the metadata stored in the local repository 108 based on the system processing commands from the system processor 102 and analyzes impact of different modules within the computer program. This impact between various modules is analyzed by identifying inter-dependencies and intra-dependencies between different components within the plurality of modules. Dependency data is then obtained based on the identified inter-dependencies and intra-dependencies. The impact analyzer 110 comprises a hierarchy generator 112 which creates a hierarchy structure of the modules and the components within the computer program based on the obtained dependency data. This hierarchy structure and the dependency data is provided to a dependency recorder 114 which creates a dependency table containing information related to the modules and the components and their respective dependencies. A central repository 116 stores this dependency table with corresponding information related to the modules and components within the computer program. A query manager 118 present in the system 100 cooperates with the central repository to respond to user queries. For example, a user can request information like 'How many components are impacted when a change is required in a specific component of a specific computer program?' OR 'What components are to be tested when a change is done in a specific component?' similar such queries are handled by the query manager to provide appropriate responses which are then displayed to the user on a display 126. The query manager 118 includes an input module 120 which accepts input queries from users. These queries as mentioned above include queries related to the modules and the components and their dependencies. A crawler extractor 122 cooperates with the input module 120 and identifies the modules and the components from the input queries. The crawler extractor 122 then crawls through the central repository 116 and extracts dependency information stored in the dependency table corresponding to the identified modules and components from the central repository 116. A reporting module 124 then receives the extracted dependency information corresponding to the input queries, and creates reports explaining the received dependency information stating which modules and components will be affected by a particular action. The display 126 displays these reports explaining the dependencies between the modules and the components within the computer program.

TECHNICAL ADVANTAGES

The technical advantages of the computer implemented maintenance toolkit for implementation of computer commands of the present disclosure include:

providing a system to automatically store, update, maintain and manage computer programs after their development;

providing a system that captures and stores information of a computer program along with the relationship and dependencies between multiple modules and components within the computer program; and providing a system that correctly identifies impact of change in modules and components of a computer program on each other.

While considerable emphasis has been placed herein on the particular features of this disclosure, it will be appreciated that various modifications can be made, and that many changes can be made in the preferred embodiment without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

The invention claimed is:

1. A computer implemented maintenance toolkit for implementation of computer programs, said toolkit comprising:

a system processor possessing functional elements and a pre-determined set of rules to provide system processing commands for carrying out different functions by different modules present in the toolkit;

a receiver configured to receive, a computer program containing a plurality of modules, said plurality of modules within said computer program containing a plurality of components;

a metadata retriever cooperating with said receiver and adapted to receive the plurality of modules and the plurality of components within said computer program, and configured to extract, metadata from the plurality of components contained in the plurality of modules in said computer program;

a local repository cooperating with the metadata retriever adapted to receive the metadata and configured to store the metadata;

an impact analyzer cooperating with the local repository adapted to receive the stored metadata and analyze, impact of said plurality of modules within the computer program, on each other by identifying inter-dependencies and intra-dependencies between said plurality of components contained in said plurality of modules within the computer program to obtain dependency data, said impact analyzer including a hierarchy generator configured to create a hierarchy structure of said plurality of modules and said plurality of components, contained in said plurality of modules within the computer program, based on the dependency data;

a dependency recorder adapted to cooperate with said impact analyzer to receive the dependency data and the hierarchy structure, said dependency recorder configured to create, based on the dependency data and the hierarchy structure, a dependency table containing information related to said plurality of modules and said plurality of components, contained in said plurality of modules within the computer program, and their respective dependencies;

a central repository cooperating with the dependency recorder for receiving the dependency table and storing the dependency table with corresponding information related to said plurality of modules and said plurality of components, contained in said plurality of modules within the computer program to maintain said computer program; and a query manager cooperating with the central repository, said query manager including:
  an input module configured to accept input queries from users, said input queries including queries related to said plurality of modules and said plurality of components contained in said plurality of modules within the computer program;
  a crawler extractor cooperating with the input module to identify said plurality of modules and said plurality of components, contained in said plurality of modules within the computer program, from the input queries, and configured to crawl through the central repository and extract from the central repository, dependency information stored in the dependency table corresponding to the identified plurality of modules and the identified plurality of components contained in said plurality of modules within the computer program; and
  a reporting module cooperating with the crawler and extractor for receiving the dependency information corresponding to the input queries, and configured to create reports explaining the received dependency information.

2. The toolkit as claimed in claim 1, wherein said toolkit comprises a display cooperating with the reporting module and configured to display the reports explaining the dependencies between said plurality of modules and said plurality of components contained in said plurality of modules within said computer program.

3. The toolkit as claimed in claim 1, wherein said plurality of modules within the computer program further comprise a plurality of sub-modules that contain a plurality of components.

4. The toolkit as claimed in claim 1, wherein said plurality of components, contained in said plurality of modules within said computer program, are selected from a group of forms, graphs, sequences, views, procedures, tables, objects, triggers and any combinations thereof.

5. A computer-implemented method for implementing a maintenance toolkit for implementation of computer programs, said method comprising:
  possessing, in a system processor, functional elements and a pre-determined set of rules for providing system processing commands for carrying out different functions by different modules present in the toolkit;
  receiving, by a receiver, a computer program containing a plurality of modules, said plurality of modules within the computer program containing a plurality of components;
  extracting, by a metadata retriever, metadata from said plurality of components contained in said plurality of modules within the computer program;
  storing, using a local repository, said metadata;
  receiving, using an impact analyzer, the stored metadata and analyzing impact of said plurality of modules within the computer program on each other by identifying inter-dependencies and intra-dependencies between said plurality of components contained in said plurality of modules within the computer program to obtain dependency data;
  creating, using a hierarchy generator, a hierarchy structure of said plurality of modules and said plurality of components, contained in said plurality of modules within the computer program, based on the dependency data;
  receiving, using a dependency recorder, the dependency data and the hierarchy structure and creating based on the dependency data and the hierarchy structure, a dependency table containing information related to said plurality of modules and said plurality of components, contained in said plurality of modules within the computer program, and their respective dependencies;
  storing, in a central repository, the dependency table with corresponding information related to said plurality of modules and said plurality of components, contained in said plurality of modules within the computer program, to maintain said computer program;
  accepting, using an input module, input queries from users, said input queries including queries related to said plurality of modules and said plurality of components contained in said plurality of modules within the computer program;
  identifying, using a crawler extractor, said plurality of modules and said plurality of components, contained in said plurality of modules within the computer program, from the input queries and crawling through the central repository and extracting from the central repository, dependency information stored in the dependency table corresponding to the identified plurality of modules and the identified plurality of components contained in said plurality of modules within the computer program; and
  receiving, using a reporting module, the dependency information corresponding to the input queries and creating reports explaining the received dependency information.

6. The method as claimed in claim 5, wherein said method comprises a step of displaying, using a display, the reports explaining the dependencies between said plurality of modules and said plurality of components contained in said plurality of modules within said computer program.

7. The method as claimed in claim 5, wherein said plurality of modules within the computer program further comprise a plurality of sub-modules that contain a plurality of components.

8. The method as claimed in claim 5, wherein said plurality of components, contained in said plurality of modules within the computer program, are selected from a group of forms, graphs, sequences, views, procedures, tables, objects, triggers and any combinations thereof.

* * * * *

UNITED STATES PATENT AND TRADEMARK OFFICE
CERTIFICATE OF CORRECTION

PATENT NO. : 9,588,761 B2
APPLICATION NO. : 14/698374
DATED : March 7, 2017
INVENTOR(S) : Tanay K. Das et al.

Page 1 of 1

It is certified that error appears in the above-identified patent and that said Letters Patent is hereby corrected as shown below:

In the Claims

At Column 6, Claim number 1, Line number 30, delete "," after "to receive" and before "a computer".

At Column 6, Claim number 1, Line numbers 44-45, delete "," after "and analyze" and before "impact of".

At Column 7, Claim number 1, Line number 2, insert --,-- after "computer program" and before "to maintain".

Signed and Sealed this
Thirteenth Day of June, 2017

Joseph Matal
*Performing the Functions and Duties of the
Under Secretary of Commerce for Intellectual Property and
Director of the United States Patent and Trademark Office*